(12) United States Patent
Meroney

(10) Patent No.: US 8,230,640 B2
(45) Date of Patent: Jul. 31, 2012

(54) SIMULATED MUDPUPPY FISHING LURE

(76) Inventor: Robert L. Meroney, Grand Saline, TX (US)

( * ) Notice: Subject to any disclaimer, the term of this patent is extended or adjusted under 35 U.S.C. 154(b) by 1519 days.

(21) Appl. No.: 11/093,969

(22) Filed: Mar. 30, 2005

(65) Prior Publication Data

US 2006/0096154 A1  May 11, 2006

(51) Int. Cl.
*A01K 85/00* (2006.01)

(52) U.S. Cl. ............ 43/42.26; 43/42.24; 43/42.28; 43/42.3; 43/42.36; 43/42.47

(58) Field of Classification Search ........... 43/42.24, 43/42.26, 42.28, 42.3, 42.36, 42.47
See application file for complete search history.

(56) References Cited

U.S. PATENT DOCUMENTS

| | | | | |
|---|---|---|---|---|
| D81,433 S * | 6/1930 | Boehm | ............ | D22/132 |
| 1,866,289 A * | 7/1932 | Boehm | ............ | 43/42.26 |
| 2,785,497 A * | 3/1957 | Berry | ............ | 43/42.26 |
| 3,205,609 A * | 9/1965 | Knapton | ............ | 43/42.09 |
| 4,819,365 A * | 4/1989 | Landuydt | ............ | 43/42.47 |
| 4,993,183 A * | 2/1991 | Carver | ............ | 43/42.06 |
| 5,009,024 A * | 4/1991 | Parman | ............ | 43/42.3 |
| 5,465,523 A * | 11/1995 | Garst | ............ | 43/42.24 |
| 5,996,271 A * | 12/1999 | Packer | ............ | 43/42.24 |
| D424,654 S * | 5/2000 | Canales | ............ | D22/132 |
| D469,153 S * | 1/2003 | Gibbs | ............ | D22/132 |
| 6,753,004 B2 * | 6/2004 | Ollis et al. | ............ | 424/410 |
| D498,509 S * | 11/2004 | Toscano, Jr. | ............ | D22/132 |
| 7,134,236 B2 * | 11/2006 | Chen | ............ | 43/42.24 |
| 2003/0192227 A1 * | 10/2003 | Stava et al. | ............ | 43/42.24 |

* cited by examiner

*Primary Examiner* — David Parsley
(74) *Attorney, Agent, or Firm* — Christopher Wood; Premier Law Group, PLLC

(57) ABSTRACT

A simulated fishing lure replicates the physical characteristics and swimming motion of a live North American mudpuppy, while preventing a captured fish from escaping by biting through the lure. The lure comprises of a lure body (a head, midsection and tail) and a motion-creating bill. The motion-creating bill and the lure body's tail work together to create the life-like side-to-side swimming motion of the lure. The longitudinal inner cavity within the midsection of the lure body contains an anchoring device to ensure that the fishing line and hook remain secured to the fish, even when the lure is bitten in half.

9 Claims, 4 Drawing Sheets

SIMULATED MUDPUPPY FISHING LURE

BACKGROUND OF INVENTION

1. Technical Field

This invention relates generally to fishing lures and, more particularly, to a lifelike fishing lure, shaped and colored to mimic the physical characteristics of a salamander, the North American mudpuppy or waterdog (*Necturus maculosus*), that simulates the live swimming motion both above and below the surface of the water. Also, the lure has a longitudinal inner cavity that allows fishing line to be secured deep within the body of the lure in order to prevent a fish from escaping, even when the fish bites through the lure.

2. Description of Related Art

A wide variety of live bait and artificial fishing lures are used to attract and catch fish. However, the use of live bait is not allowed in the majority of fishing competitions. Because many fishermen prefer to use live bait rather than an artificial lures, some have attempted to create artificial lures that mimic the characteristics of live bait.

Artificial fishing lures shaped to resemble their live counterparts are known in the prior art. These lures resemble live bait such as worms, minnows, crawfish, and the like. Several prior art patents disclose artificial lures shaped to resemble salamanders.

For example, U.S. Pat. No. 4,993,183, issued to Carver discloses oil-impregnated flexible plastic fishing lures in various shapes including one that generally resembles a salamander. Similarly, U.S. Pat. No. Des. 424,654, issued to Canales discloses a fishing lure design that also resembles a salamander. Neither of these prior art patents closely replicate the shape, coloring and swimming motion both above and below the surface of the water of a live mudpuppy.

U.S. Pat. No. 5,996,271, issued to Parker discloses a fishing lure in the general shape of a salamander. The lure has a hollow inner chamber that provides buoyancy and assists in creation of bubbles to entice fish. The thin flat portions of the legs and tail move in an oscillating motion when interacting with water also in an effort to entice fish. However, the general appearance of the device is not truly like that of a live salamander, and, the device's oscillating motion in water does not simulate a live salamander's side-to-side swimming motion.

What is needed is an artificial fishing lure that is truly a lifelike simulation of a live mudpuppy in shape, coloring, and swimming motion that is also designed to prevent a fish from escaping capture by biting through the lure.

SUMMARY OF INVENTION

The present invention comprises of a single, plastic lure body with a head, legs and a tail that are all shaped and colored to present a truly lifelike image of a mudpuppy. The body of the device has a hollow longitudinal chamber with its opening at the midsection of the lure. A fishing line is attached to the lure by a line connector secured to the head or a motion-creating bill. Anchoring means such as metal wire, fishing line, or other strong cable like material secures the head, bill, or line connector to a hook extending from the midsection.

The body of the lure, replicates the physical features of a live mudpuppy and has a motion-creating bill attached to its underside. The bill works in concert with the tail to create lifelike side-to-side movement of the lure above and below the water line. On a long cast, the lure will dive two to three feet below the water line without the assistance of weights in the head or body.

The primary advantage of the fishing lure is that it replicates the physical characteristics and swimming motion of a salamander while making escape difficult for a captured fish by biting through the lure due to the anchoring means. This truly lifelike lure can be used in fishing competitions where its live counterpart cannot.

BRIEF DESCRIPTION OF THE DRAWINGS

The novel features believed characteristic of the main invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

LIST OF REFERENCE NUMERALS

Figure 1:
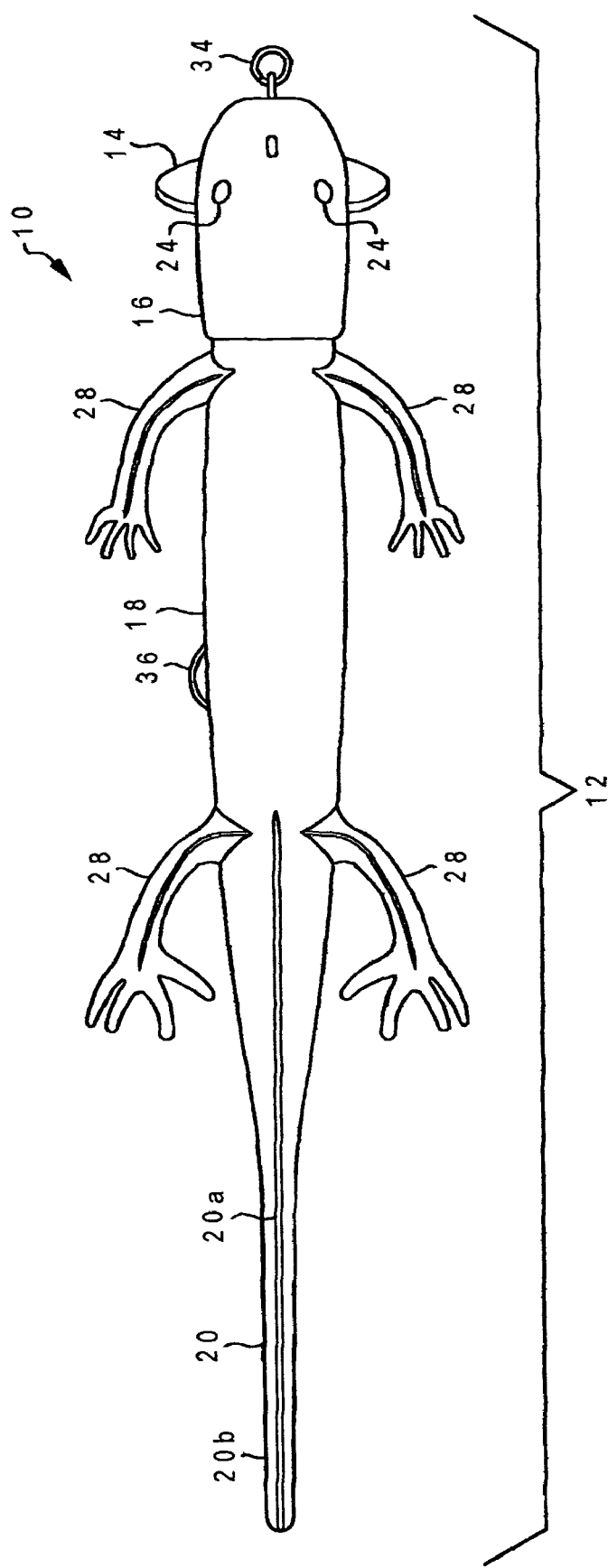
FIG. 1 is a top, plan view of a simulated mudpuppy fishing lure in accordance with the present invention.

10 simulated salamander fishing lure
12 lure body
14 motion-creating bill
14a oblong portion of bill 14
14b oval lip of bill 14
16 head
18 midsection
20 tail
20a long slender portion of tail 20
20b flat portion of tail 20
24 eyes
26 throat
28 legs
30 inner cavity
32 anchoring means
34 line connector

DETAILED DESCRIPTION

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Figure 2:
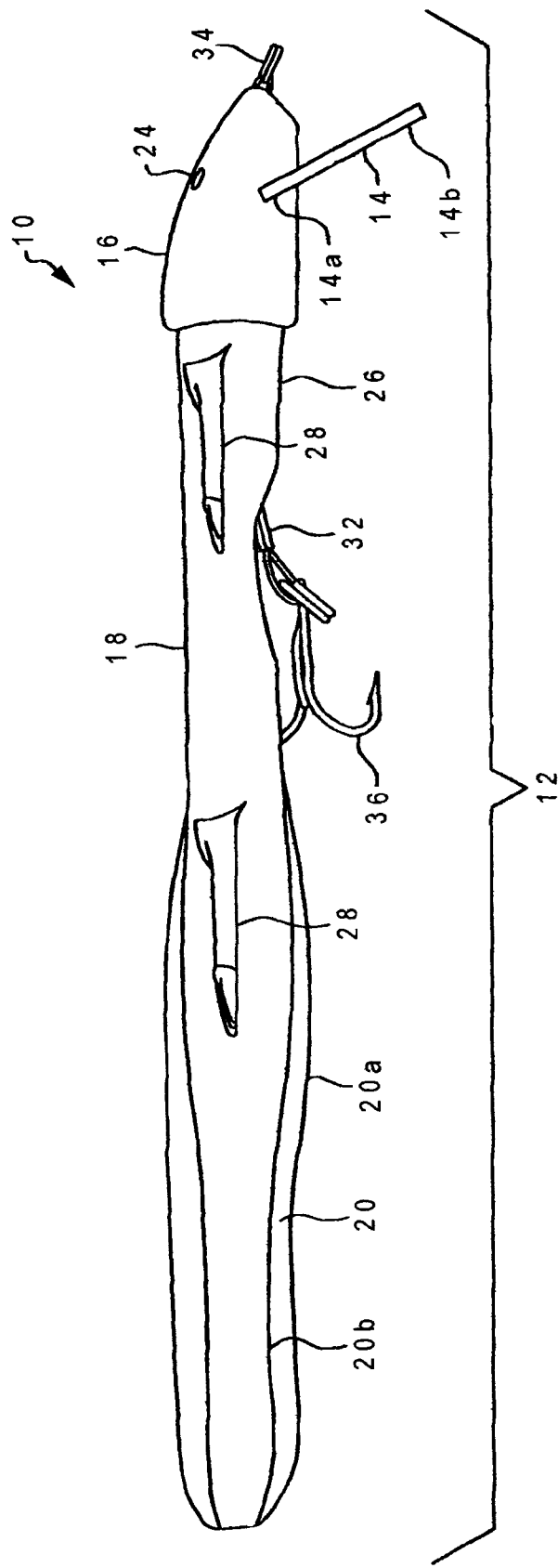
FIG. 2 is side plan view of a simulated mudpuppy fishing lure in accordance with the present invention.
Figure 3:
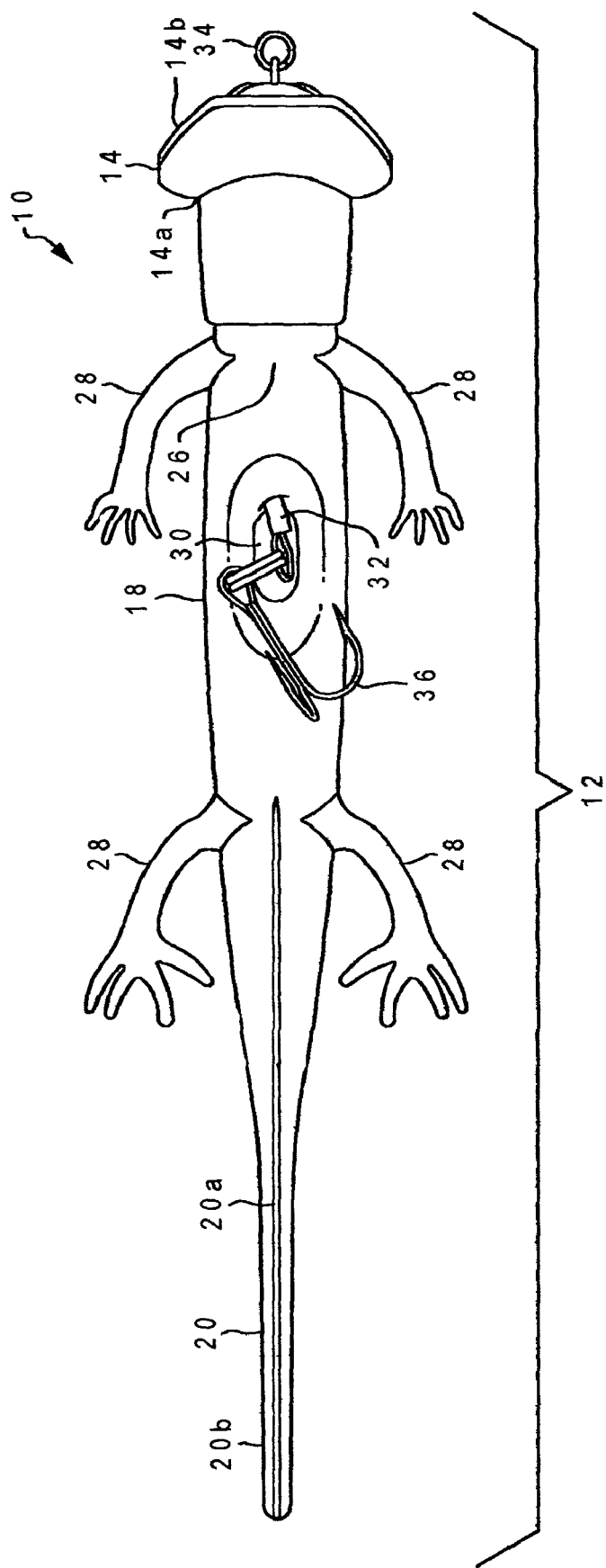
FIG. 3 is a bottom plan view of a simulated mudpuppy fishing lure in accordance with the present invention.
Figure 4:
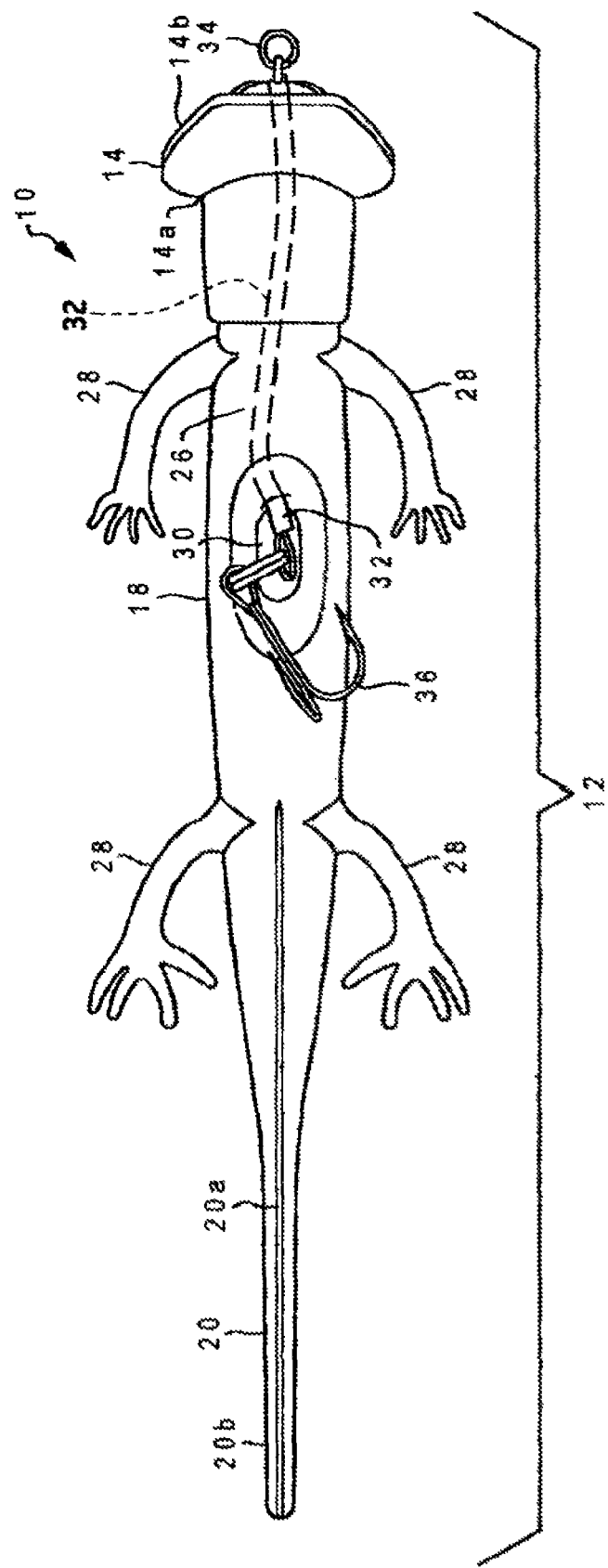
FIG. 4 is a bottom plan view of a simulated mudpuppy fishing lure in accordance with the present invention.

FIGS. 1 through 3 show a simulated salamander fishing lure 10, which comprises a lure body 12 and motion-creating bill 14. The lure replicates the physical characteristics and swimming motion of a live salamander from the order Caudata. In a preferred embodiment, the lure replicates the swimming characteristics of the salamander commonly known as the mudpuppy or waterdog in the family Proteidae. The fishing lure shown in FIGS. 1, 2, and 3 is in the genus *Necturus*.

The lure body 10 can be shaped, colored and textured to simulate that of a salamander selected from the species *Necturus lewisi*, *Necturus maculosus*, *Necturus beyeri*, *Necturus alabamensis*, *Necturus punctatus*, and *Proteus anguineus*.

Lure body 12, shown in a top, side and bottom view in FIGS. 1, 2 and 3 respectively, comprises head 16 having a front portion and a rear portion, a midsection 18 and a tail 20. Head 16 has a pair of eyes 24 on its topside and a throat 26 on its bottom side. The first end of throat 26 is attached to the rear of head 16 and the second end of throat 26 is attached to midsection 18.

A plurality of legs 28 are attached to midsection 18. Preferably, legs 28 are attached to the front and rear portion of midsection 18 and have a plurality of toes, preferably three or four toes. Legs 28 attached to the front portion of midsection 18 extend generally outward and rearward tail 20 but may extend in any direction such as towards head 16. The pair of legs 28 attached to the rear portion of midsection 18 extend generally outward, and rearward towards tail 20 and also may extend in any direction. The first end of tail 20 is attached to the rear portion of midsection 18. Tail 20 comprises, generally, of long portion 20a and distal end 20b.

A longitudinal inner cavity 30, FIG. 3, is formed within midsection 18. Inner cavity 30 contains anchoring means 32. Anchoring means 32 extends from hook 36 to line connector 34 on the front portion of head 16. Still referring to FIG. 3, the midsection 18 defines an exterior bottom side, wherein the inner cavity 30 is in direct communication with the exterior bottom side of the midsection.

The first end of motion-creating bill 14 is secured to the underside of head 16, at an angle between approximately 10-80 degrees from the front portion of head 16 and preferably approximately 40-60 degrees from front portion of head 16 to assist in producing the desired life-like swimming effect. Motion-creating bill 14 may be located on the front or rear portion of head 16 and in preferably located in the front portion of head 16.

Bill 14 is comprised of an oblong portion 14a with a flat base at its first end and a flat oval lip 14b about its curved second end. The oblong portion 14a of bill 14 is concave with the concavity facing out away from lure body 12.

Line connector 34 can be attached to head 16 or bill 14 depending on the users preference. Line connector 34 is used to connect and secure the fishing line to the lure. Line connector 34 is attached to anchoring means 32. Anchoring means 32 is a strong fishing line or metal wire connecting head 16, bill 14, or line connector 34 to hook 36. By using anchoring means 32, fish are not able to bit through lure 10 and escape.

Lure 10's lure body 12 and bill 14 are formed from any material flexible enough to produce a swimming effect and preferably formed from plastic materials. Lure body 12 is shaped, colored and its surface is textured to closely replicate that of a live North American mudpuppy in the family Proteidae.

Preferably, lure 10 can be produced in various sizes. However, irrespective of size of lure 10, the following ratios are maintained: the overall length of lure body 12 to the length of head 16, midsection 18, and tail 20, the length of midsection 18 to the length of inner cavity 30; the length of head 16 to the length of bill 14; and width of bill 14's oblong portion 14a to the width of its oval lip 14b. The ratios should be maintained to ensure that the lifelike appearance and swimming motion of lure 10 is retained at any size.

When a fisherman places lure 10 in the water, he or she will first notice that lure 10 moves slightly while sitting atop of apparently still water. Then, when lure 10 is cast, it will dive—up to two to three feet on a long cast—without the use of any weights inside or on the lure.

Upon reeling in the fishing line, the angle of bill 14 and tail 20 work in concert to create the lifelike side-to-side swimming motion of a salamander. The concave portion of bill 14, facing the water as lure 10 is pulled through it, creates eddies that buffet lure body 12 causing the body to move from side to side. Tail 20 stabilizes lure 10 by preventing lure body 12 from twisting as the side to side movement is created; thus, facilitating the lifelike swimming motion of lure 10.

If a fish is caught using lure 10, it will find escape difficult by biting through the lure because anchoring means 32 is secured deep within lure 10's inner cavity 30. So, even if lure 10 is bitten in half, the fishing line will still be secured to the fish by hook 36 and anchoring means 32.

Therefore, with the advent of lure 10, the fisherman finally has a truly lifelike salamander lure that mimics a salamander's physical characteristics and swimming motion while preventing captured fish from easily escaping.

While the invention has been particularly shown and described with reference to a preferred embodiment, it will be understood by those skilled in the art that various changes in form and detail may be made without departing from the spirit and scope of the invention. For example, gills may be added to the lure to match the gills of a specific species.

It is to be understood that the present invention is not limited to the sole embodiment described above, but encompasses any and all embodiments with the scope of the following claims.

What is claimed is:

1. A fishing lure that simulates a live mudpuppy's side-to-side swimming motion, the fishing lure comprising:
    a lure body, wherein said lure body is shaped, colored and textured to simulate that of a salamander from the family Proteidae, said lure body comprising a head, a midsection, and a tail, wherein said midsection includes an inner cavity, said inner cavity contains an anchoring means for connected to a hook and a line attachment means, said head defines an underside, said midsection comprises an exterior bottom side, said inner cavity is in direct communication with the exterior bottom side of the midsection, wherein said head has a front portion and a rear portion and said line attachment means, wherein said midsection comprises said hook and a front portion and rear portion, wherein the front portion of said midsection is attached to the rear portion of said head, and said tail having a first and a distal end wherein the first end is attached to the rear portion of the midsection, wherein said anchoring means comprises a tubular member extending from said midsection to said line attachment means, said tubular member having a first end and a second end, the anchoring means further comprising a first loop at the first end and a second loop at the second end, the first loop for attaching the line attachment means to the head of the lure body and the second loop for attaching the hook to the midsection of the lure body; and
    a motion-creating bill for creating a side-to-side swimming motion, said bill is secured to said underside of said head.

2. The lure in claim 1, wherein said lure body is shaped, colored, and textured to simulate that of a salamander from the genus *Necturus*.

3. The lure in claim 1, wherein said bill contain a fishing line attachment means.

4. The lure in claim 1, wherein said midsection comprises:
    a pair of legs attached to the front portion of said midsection; and
    a pair of legs attached to the rear portion of said midsection.

5. The lure in claim 1, wherein said fishing line attachment means is a line connector, wherein said line connector is located on said head.

6. The lure in claim 1, wherein said tail comprises:
a long slender portion, and
a flattened, portion at the distal end of said tail.

7. The lure in claim 1, wherein said bill comprises:
an oblong portion with a flat first end and a curved second end, and
a flat oval lip about said curved second end of said bill.

8. The lure in claim 2, wherein said head has a front portion and a rear portion, said bill is secured to said underside of said head at an angle of approximately 10-80 degrees from the front portion of said head.

9. The lure in claim 2, wherein said head has a front portion and a rear portion, said bill is secured to said underside of said head at an angle of approximately 40-60 degrees from the front portion of said head.

\* \* \* \* \*